(12) United States Patent
Varunjikar et al.

(10) Patent No.: US 10,569,801 B2
(45) Date of Patent: *Feb. 25, 2020

(54) PAYLOAD ESTIMATION USING ELECTRIC POWER STEERING SIGNALS

(71) Applicant: STEERING SOLUTIONS IP HOLDING CORPORATION, Saginaw, MI (US)

(72) Inventors: Tejas M. Varunjikar, Rochester Hills, MI (US); Anthony J. Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,265

(22) Filed: Oct. 7, 2016

(65) Prior Publication Data

US 2017/0101127 A1  Apr. 13, 2017

Related U.S. Application Data

(60) Provisional application No. 62/239,578, filed on Oct. 9, 2015.

(51) Int. Cl.
  *B62D 5/04* (2006.01)
(52) U.S. Cl.
  CPC .................. *B62D 5/0463* (2013.01)
(58) Field of Classification Search
  None
  See application file for complete search history.

(56) References Cited

U.S. PATENT DOCUMENTS

| 2003/0150366 A1 | 8/2003 | Kaufmann et al. |
| 2004/0099469 A1 | 5/2004 | Koibuchi et al. |
| 2004/0189228 A1 | 9/2004 | Katch et al. |

(Continued)

FOREIGN PATENT DOCUMENTS

| CN | 1903633 A | 1/2007 |
| CN | 101395056 A | 3/2009 |

(Continued)

OTHER PUBLICATIONS

European Search Report for EP Application No. 12196797.0, dated Jun. 7, 2013, 7 pages.

(Continued)

*Primary Examiner* — Abdhesh K Jha

(57) ABSTRACT

A payload estimation system and a method for estimating payload estimation using electric power steering (EPS) signals are provided. In certain embodiments, the aspects of the invention may include: receiving, by a payload detection module, multiple EPS signals to generate an additional axle load factor, determining, by a blend factor table, a load blend factor according to the additional axle load factor, generating, by a first multiplier, a blended nominal base assist signal by combining the load blend factor and a handwheel torque signal processed by a nominal base assist module, generating, by a second multiplier, a blended highload base assist signal by combining the load blend factor and the handwheel torque signal processed by a highload base assist module, and combining, by a merge module, the blended nominal base assist and the blended highload base assist to generate a motor torque command for the EPS system.

19 Claims, 14 Drawing Sheets

(56) References Cited

U.S. PATENT DOCUMENTS

| | | |
|---|---|---|
| 2008/0027609 A1 | 1/2008 | Aoki et al. |
| 2009/0069981 A1 | 3/2009 | Barthomeuf et al. |
| 2010/0004824 A1 | 1/2010 | Ikeda et al. |
| 2010/0292896 A1 | 11/2010 | Watanabe et al. |

FOREIGN PATENT DOCUMENTS

| | | | |
|---|---|---|---|
| EP | 2289767 | A2 | 2/2011 |
| JP | 2010101746 | A | 5/2010 |

OTHER PUBLICATIONS

Office Action dated Apr. 5, 2016.
Office Action dated May 9, 2016.

PAYLOAD ESTIMATION USING ELECTRIC POWER STEERING SIGNALS

CROSS-REFERENCES TO RELATED APPLICATIONS

This patent application claims priority to U.S. Provisional Patent Application Ser. No. 62/239,578, filed Oct. 9, 2015, which is incorporated herein by reference in its entirety.

BACKGROUND OF THE INVENTION

The invention relates to electrical power steering system, and more particularly to methods and systems for payload estimation using electric power steering signals for consistent steering feel.

Traditional power-assist steering systems, such as Electric Power Steering (EPS) systems, are used in different vehicle classes ranging from light vehicles (small hatchbacks) to heavy vehicles (Pickup trucks, Vans). The electric motor acts as an actuator to assist the vehicle operator while steering the vehicle. Typically, EPS parameters are tuned to give optimal steering feel on various road surfaces for nominal vehicle load conditions. During use of the vehicle, payload may be added or subtracted from the vehicle. This change in payload changes the load, or force, exerted by each tire upon the road, which may significantly change a kingpin torque (and hence change rack load) when compared to the nominal load conditions. Changes in kingpin torque may result in an inconsistent steering effort 'feel' experienced by the operator. That is, the amount of steering effort may change with changes in payload for more traditional EPS systems.

Accordingly, it is desirable to develop an EPS system that is more robust, low cost, and/or may be capable of reducing inconsistencies in steering effort with changes in payload.

SUMMARY OF THE INVENTION

In one aspect, the invention relates to a payload estimation system for maintaining consistent steering feel using electric power steering (EPS) signals. In certain embodiments, the payload estimation system includes: a payload detection module, a blend factor lookup table, a nominal base assist module, a highload base assist module, and a signal combiner. The payload detection module detects payload according to multiple EPS signals and generate an additional axle load factor. The blend factor lookup table determines a load blend factor according to the additional axle load factor. The nominal base assist module generates a nominal base assist and the highload base assist module generates a highload base assist based on a handwheel torque. The signal combiner combines a blended nominal base assist and a blended highroad base assist to generate a motor torque command. The motor torque command may be combined with one or more additional EPS signals, such as a high frequency assist signal, and a damping signal.

In another aspect, the invention relates to a method for estimating payload estimation for maintaining consistent steering feel using electric power steering (EPS) signals. In certain embodiments, the method includes: receiving, by a payload detection module of a payload estimation system, multiple signals from an EPS system to generate an additional axle load factor, determining, by a blend factor table of the payload estimation system, a load blend factor according to the additional axle load factor. The method also includes: generating, by a first multiplier, a blended nominal base assist signal by combining the load blend factor and a handwheel torque signal processed by a nominal base assist module, generating, by a second multiplier, a blended highload base assist signal by combining the load blend factor and the handwheel torque signal processed by a highload base assist module, and combining, by a merge module, the blended nominal base assist and the blended highload base assist to generate a motor torque command for the EPS system. The method may also include combining the motor torque command with one or more additional EPS signals, such as a high frequency assist signal, and a damping signal.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings. Wherever possible, the same reference numbers are used throughout the drawings to refer to the same or like elements of an embodiment, and wherein:

DETAILED DESCRIPTION

Figure 1:
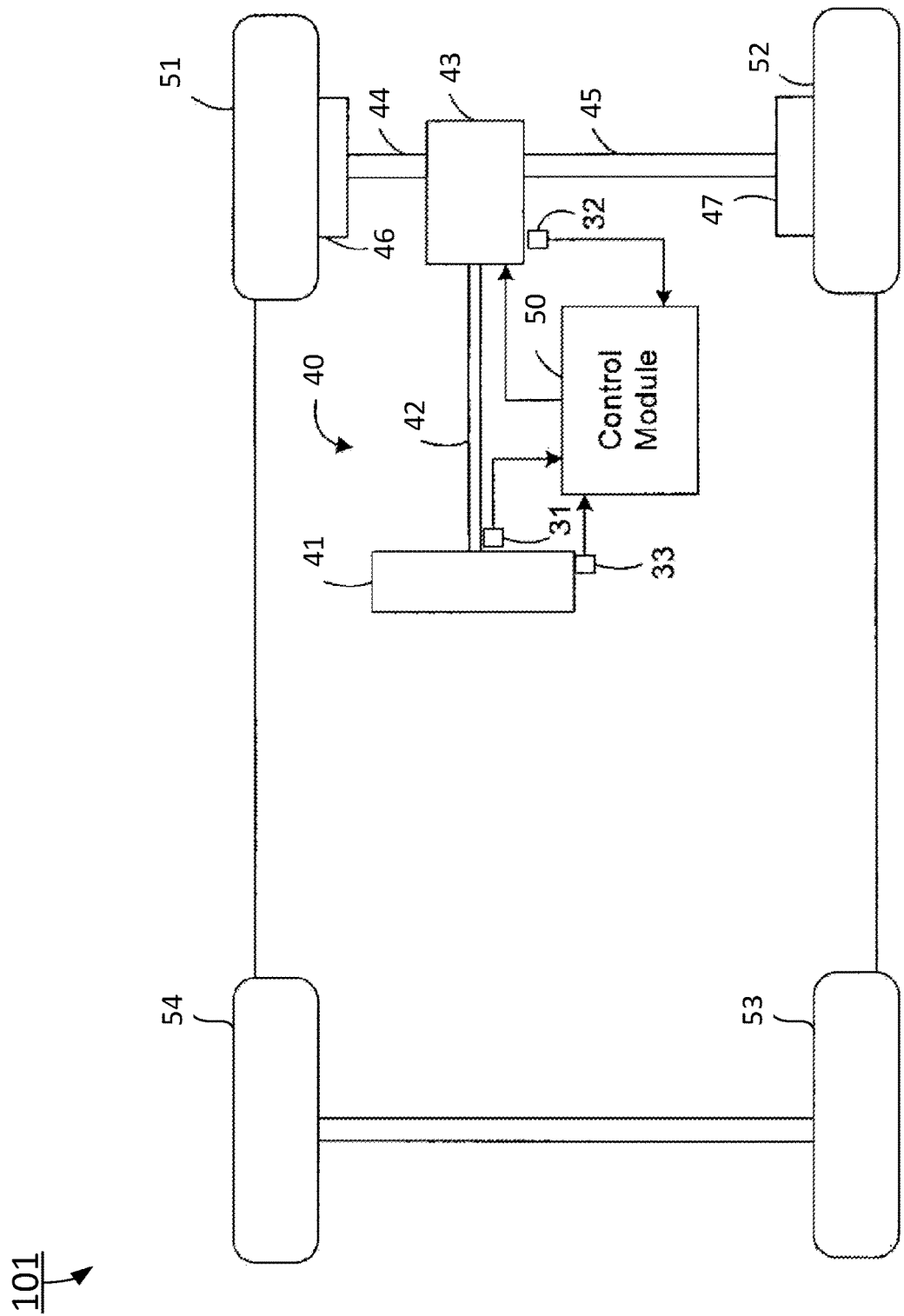
FIG. 1 illustrates a functional block diagram of an electric power steering system that includes a payload estimation system in accordance with certain exemplary embodiments of the invention.

The invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The invention will now be described more fully hereinafter with reference to the accompanying drawings FIGS. 1-16, in which certain exemplary embodiments of the invention are shown. The invention may, however, may be embodied in many different forms and should not be construed as limited to the embodiments set forth herein; rather, these embodiments are provided so that this invention will be thorough and complete, and will fully convey the scope of the invention to those skilled in the art.

The present disclosure shall describe a system that estimates an additional axle load factor. This payload detection is then used to blend between, for example, two assist tables. One assist table is designed for nominal loading, and the other assist table is designed for full load. The assist table associated with a full payload may provide additional EPS assist so that there is less variation in operator steering effort with changes in payload. In addition to assist tables, other tuning parameters such as damping may be changed based on the additional axle load factor. The payload estimation may only utilize the EPS system and existing vehicle signals that reducing vehicle cost and complexity.

In one aspect, the invention relates to a payload estimation system 100 for maintaining consistent steering feel using electric power steering (EPS) signals.

Referring now to FIG. 1, where the invention will be described with reference to specific embodiments without limiting same, an exemplary embodiment of a vehicle 101 including an electric power steering (EPS) system 40 is illustrated. In various embodiments, the EPS system 40 includes a hand wheel 41 coupled to a steering shaft 42. In one exemplary embodiment, the steering system 40 is that further includes a steering assist unit 43 that couples to the steering shaft 42 of the steering system 40 and to a first tie rod 44 and a second tie rod 45 of the vehicle 101. The EPS system 40 also includes a control module 50 to electrically control and operate the EPS system 40. The control module 50 may include the payload estimation system 100 to provide assist to the EPS system 40 according to the payload on the vehicle 10.

The steering assist unit 43 includes, for example, a rack and pinion steering mechanism (not shown) that may be coupled through the steering shaft 42 to a steering actuator motor and associated gears (hereinafter referred to as the steering actuator). During operation, as the hand wheel 41 is turned by a vehicle operator (i.e., a driver), the motor of the steering assist unit 43 provides the assistance to move the first tie rod 44 and the and second tie rods 44, 45, which in turn moves respective first and second steering knuckles 46, 47, coupled to respective roadway wheels 51 and 52 of the vehicle 101. Although an EPS system is illustrated in FIG. 1 and described herein, it is appreciated that the steering system 40 of the present disclosure can include various controlled steering systems including, but not limited to, steering systems with hydraulic configurations, and steer-by-wire configurations.

The vehicle 101 may further include a handwheel torque sensor 31, an EPS motor sensor 32, and a handwheel angle sensor 33. These sensors 31-33 detect and measure observable conditions of the steering system 40 and/or of the vehicle 101. In one embodiment, the EPS motor sensor 32 measures motor position. In another embodiment, the EPS motor sensor 32 measures motor velocity. In certain embodiments, the handwheel position and/or the motor position may be used by the payload estimation system 100. The sensors 31, 32, 33 periodically or continuously generate sensor signals based on the observable conditions. In various embodiments, the vehicle 101 may also include one or more vehicle speed sensors to measure or monitor the vehicle speed. In one embodiment, the vehicle speed sensors may be mounted on one or more of the roadway wheels. The roadway wheels may be front road wheels 51 and 52, and/or rear roadway wheels 53 and 54. In one embodiment, at least a portion of the sensors may have redundant or backup sensors to validate or complement the sensor signals. The sensors 31, 32, 33 are configured to output and send the associated signals to the payload estimation system 100.

In various embodiments, the payload estimation system 100 estimates the payload of the vehicle 101, provides estimated payload data to the steering assist unit 43, and may generally control the operation of the steering system 40 and/or the vehicle 101. This control by the payload estimation system 100 may be based on one or more of the enabled sensor signals and/or the estimated payload of the vehicle 101, and further based on assist torque calculation systems and methods of the present disclosure. Generally speaking, the methods and systems in various embodiments of the invention generate an assist torque command without using a hand wheel torque signal, which typically indicates the driver-requested assist, when the hand wheel torque sensor supplying the hand wheel torque signal becomes disabled or faulty. Specifically, the methods and systems may utilize a modified static tire model to estimate rack load or steering torque when the vehicle is stationary or moving at a relatively low velocity (e.g., at about ten kilometers per hour or less). The methods and systems may generate a scale factor based on the hand wheel angle, the hand wheel velocity, the vehicle velocity and a previously generated assist torque command. The methods and systems generate an assist torque command by scaling the estimated steering rack force with the scale factor.

Figure 2:
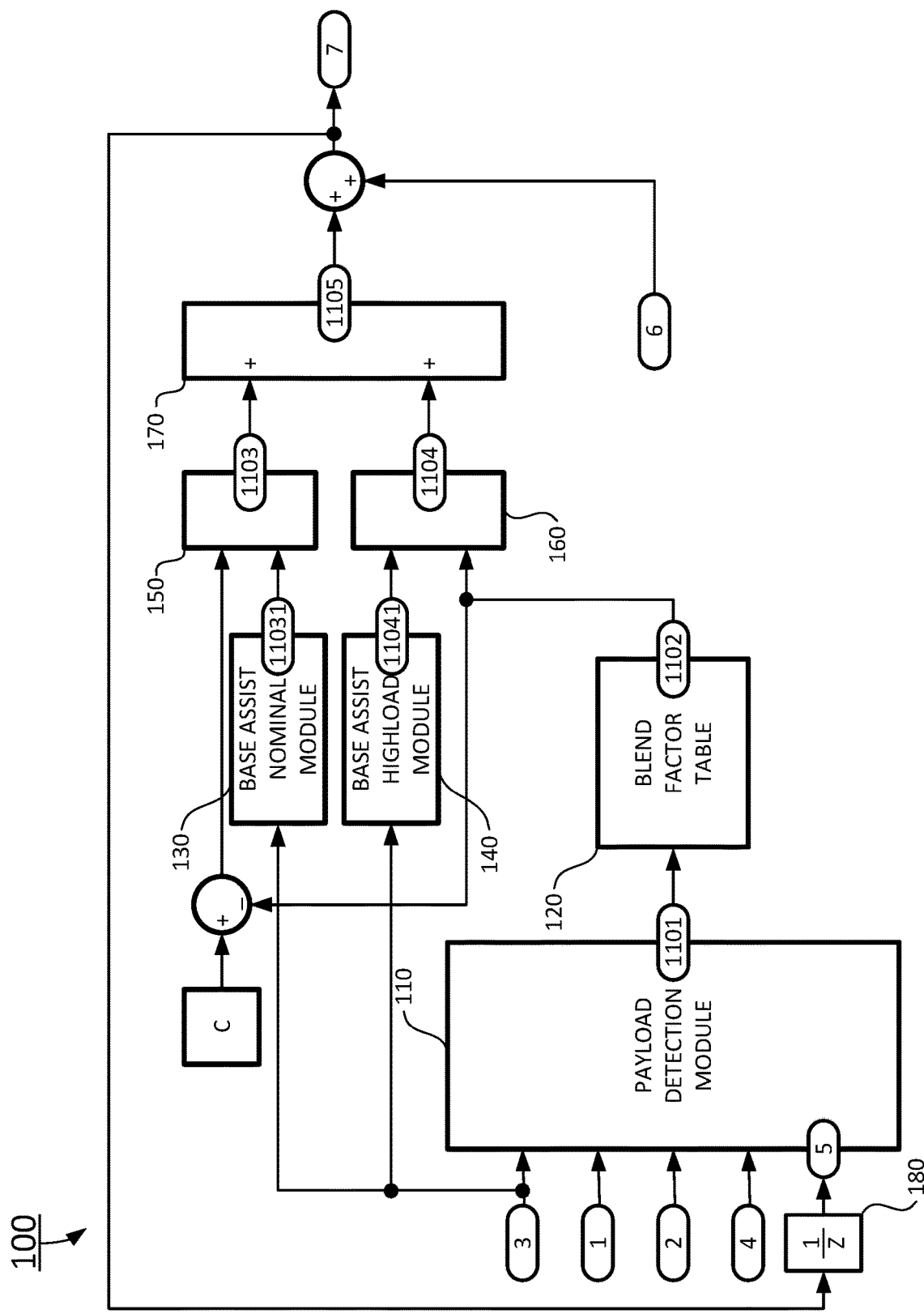
FIG. 2 is a functional block diagram illustrating a payload estimation system using electric power steering signal in accordance with certain exemplary embodiments of the invention.

FIG. 2 depicts a functional block diagram illustrating the payload estimation system 100 using electric power steering signals. In certain embodiments, the payload estimation system 100 includes one or more sub-modules and datastores, such as a payload detection module 110, a blend factor lookup table 120, a nominal base assist module 130, a highload base assist module 140, and a signal combiner 170. The payload detection module 110 detects payload according to multiple EPS signals, and generates an additional axle load factor 1101. The blend factor lookup table 120 determines a load blend factor 1102 according to the additional axle load factor 1101.

The input to the nominal base assist module 130 is the handwheel torque 3 and the output of the nominal base assist module 130 is a nominal base assist 11031. The nominal base assist 11031 is multiplied by an offset blend factor through a first multiplier 150 to generate a blended nominal base assist 1103. The offset blend factor is generated by offsetting the blend factor 1102 by a predetermined constant C. In one embodiment, the predetermined constant C is 1.

The input to the highload base assist module 140 is also the handwheel torque 3 and the output of the highload base assist module 140 is a highload base assist 11041. The highload base assist 11041 is multiplied by the blend factor 1102 to generate a blended highload base assist 1104.

The signal combiner 170 combines, or blends, the blended nominal base assist 1103 and the blended highload base assist 1104 to generate a motor torque command 7.

As used herein the terms system, unit, module, and sub-module may refer to an application specific integrated circuit (ASIC), an electronic circuit, one or more computer processors (shared, dedicated, or group) and computer writeable and readable memory that executes one or more software or firmware programs, a combinational logic circuit, and/or other suitable components that provide the described functionality. As can be appreciated, the modules shown in FIG. 2 can be combined and/or further partitioned to similarly generate an assist torque command. As can be appreciated, the modules shown in FIG. 2 can be implemented as the single payload estimation system 100 (as shown) or multiple control modules (not shown). Inputs to the payload estimation system 100 can be generated from the various sensors of the vehicle 101 as shown in FIG. 1, can be modeled within the payload estimation system 100 (e.g., by other modules (not shown)), can be received from other control modules (not shown), and/or can be predefined.

Figure 3:
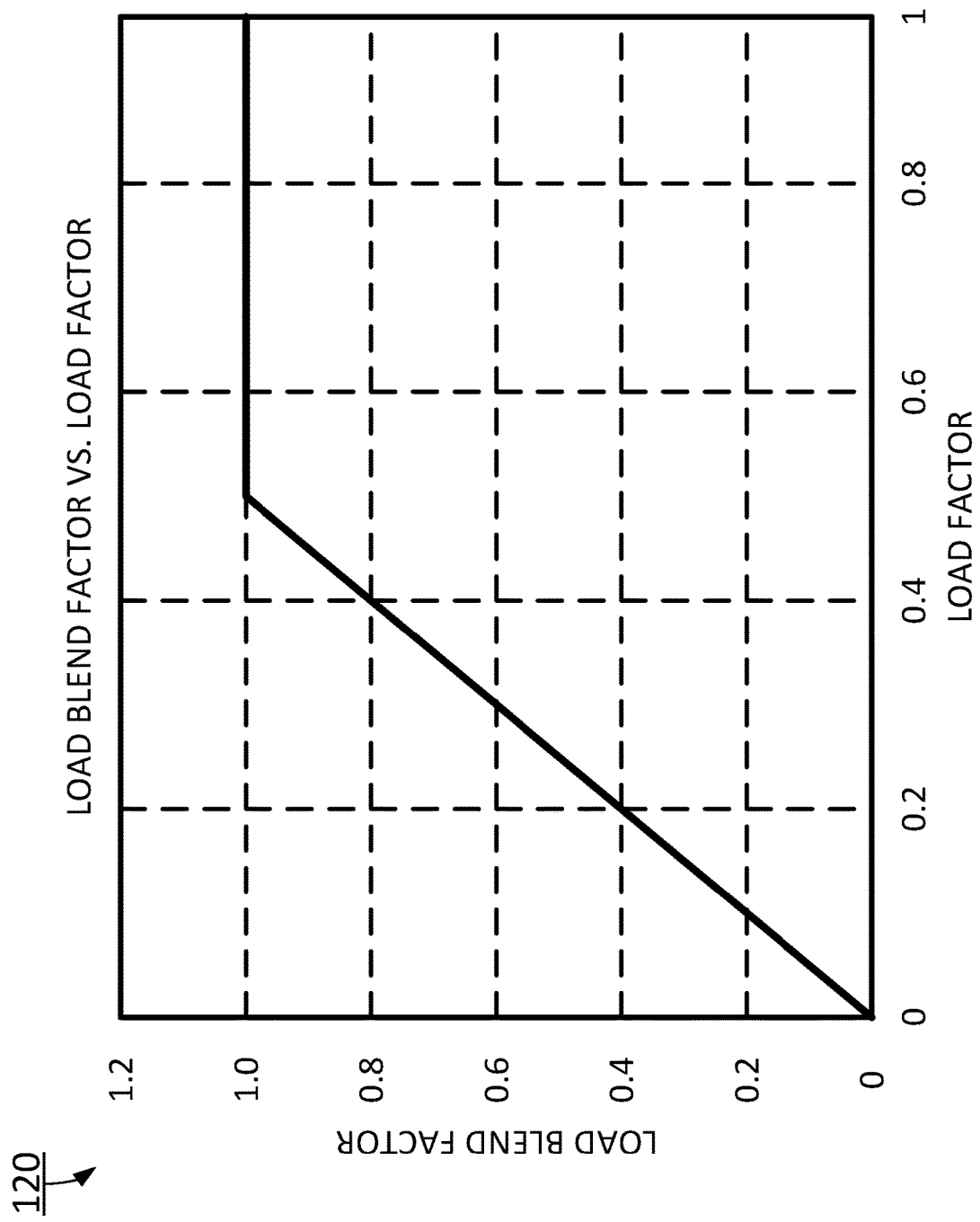
FIG. 3 is a functional curve illustrating a load blend factor vs. load factor of the payload estimation system in accordance with certain exemplary embodiments of the invention.

Referring now to FIG. 3, a functional curve illustrating a load blend factor vs. load factor of the payload estimation system 100 is shown. In certain embodiments, the additional axle load factor 1101 is input to the blend factor table 120 that calculates the load blend factor 1102 as output.

In certain embodiments, the multiple EPS signals include: a motor position 1 signal received from a power steering motor position sensor, a motor velocity 2 signal received from the EPS motor sensor 32, the handwheel torque 3 signal received from the handwheel torque sensor 31, a vehicle speed 4 signal received from one or more roadway wheel sensors, or a vehicle speed sensor mounted on a transmission of the vehicle 101, and the motor torque command 7 signal generally received from the signal combiner 170 of the payload estimation system 100.

When offset load blend factor is 0, a blended base assist 1105 equals to the blended nominal base assist 1103. When load blend factor is 1, the blended base assist 1105 equals to the blended highload base assist 1104. The motor torque command 7 may be combined with one or more additional EPS signals, such as a high frequency assist signal, and a damping signal. In some embodiments multiple blend factor tables are used to blend base assist, damping, high-frequency assist, and others.

Figure 4:
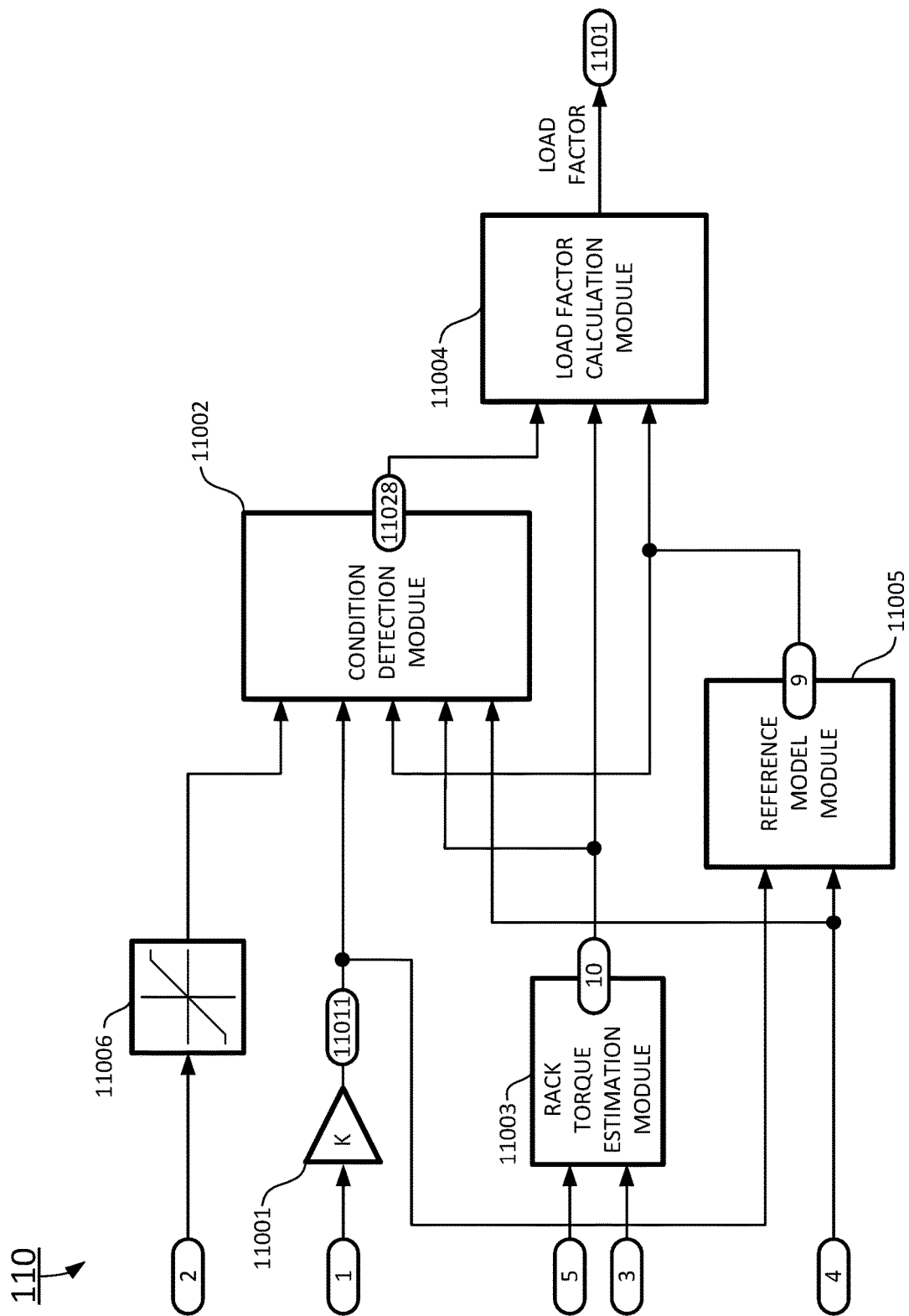
FIG. 4 is a functional block diagram illustrating a payload detection module of the payload estimation system in accordance with certain exemplary embodiments of the invention.

Referring now to FIG. 4, a functional block diagram illustrating the payload detection module 110 of the payload estimation system 100 is shown. The payload detection module 110 may include a condition detection module 11002, a rack torque estimation module 11003, a reference model module 11005, and a load factor calculation module 11004. The condition detection module 11002 generates a flag 11028 according to the multiple EPS signals. When one or more conditions are desirable to compare an estimated rack torque 10 with a reference rack torque 9, the flag 11028 is TRUE. The rack torque estimation module 11003 generates the estimated rack torque 10, and the reference model module 11005 generates the reference rack torque 9 according to a stiffness factor and an offset factor. The load factor calculation module 11004 generates the additional axle load factor 1101 based on a difference between the estimated rack torque 10 and the reference rack torque 9 and the flag 11028. In certain embodiments, the payload detection module 110 may include an amplifier 11001 to convert the motor position 1 signal to a handwheel position 11011.

Figure 5:
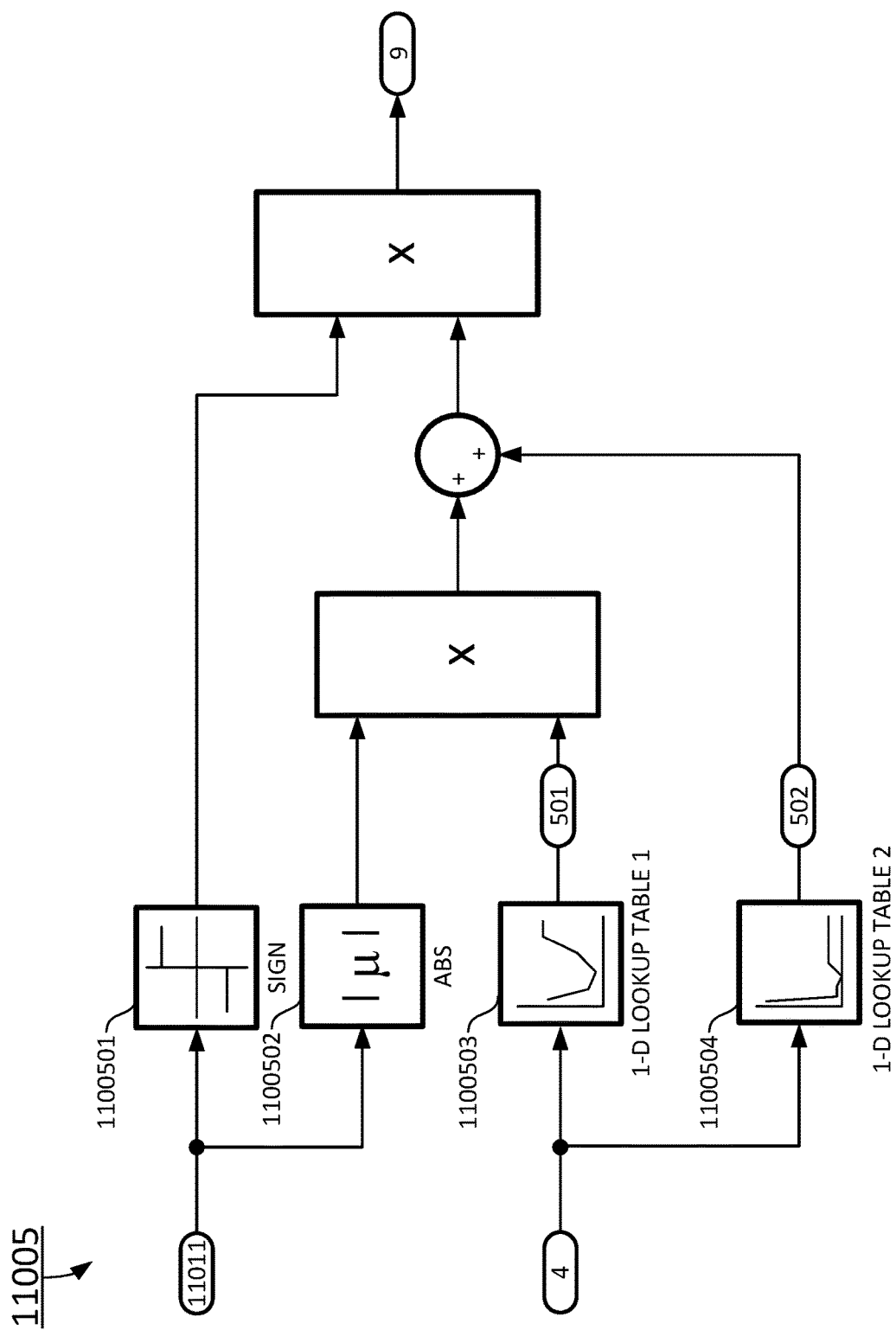
FIG. 5 is a functional block diagram illustrating a reference model module in accordance with certain exemplary embodiments of the invention.

Referring now to FIG. 5, a functional block diagram illustrating the reference model module 11005 of the payload detection module 110 is shown according to certain exemplary embodiments of the invention.

In certain embodiments, the input signals to the reference model module 11005 include the handwheel position 11011 and the vehicle speed 4. The reference model module 11005 obtains a stiffness factor 501 by a first lookup table 1100503 based on the vehicle speed 4, and obtains an offset factor 502 by a second lookup table 1100504 based also on the vehicle speed 4. The reference rack torque 9 is calculated according to following formula:

Reference Rack Torque 9=*K**HWPOS+*B*, wherein K is the stiffness factor 501, HWPOS is the handwheel position, and B is the offset factor 502.

In certain embodiments, the reference rack torque 9 may be calculated in other ways different from the calculation described herein e.g., based on vehicle model (bicycle model) based approach with different tire models.

A sign module 110501 is used to provide the reference rack torque with a corresponding sign, for example "+" or "−" based on the actual direction of the handwheel position 11011.

Figure 6:
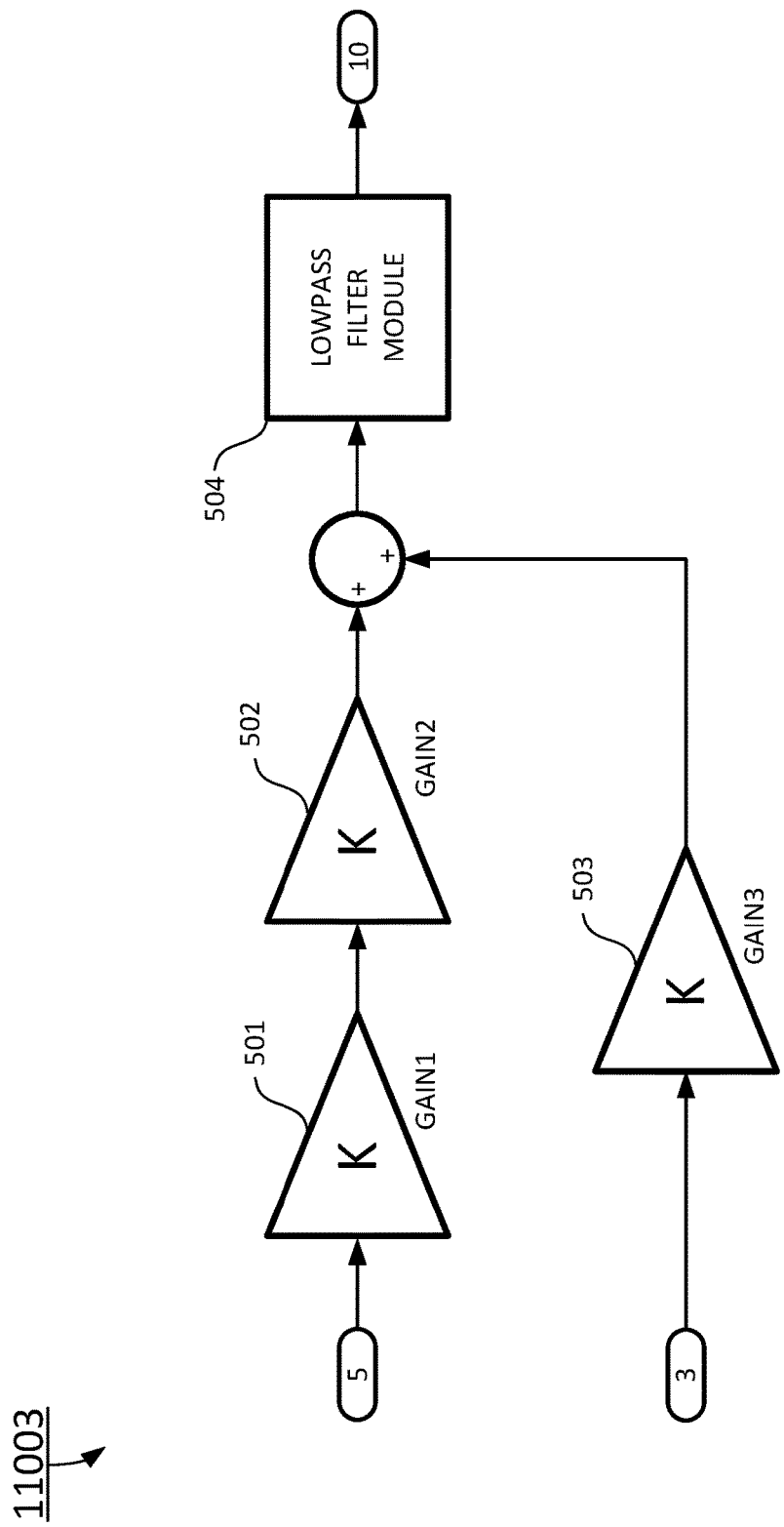
FIG. 6 is a functional block diagram illustrating an rack torque estimation module of the payload estimation system in accordance with certain exemplary embodiments of the invention.

Referring now to FIG. 6, a functional block diagram illustrating a rack torque estimation module 11003 of the payload estimation system 100 is shown according to certain embodiments of the invention.

The inputs to the rack torque estimation module 11003 include a previous motor torque command 5, and a handwheel torque signal 3. The previous motor torque command 5 is a unit time delayed motor torque command 7 through a unit time delay module 180, as shown in FIG. 2. The unit time is typically a sample time period. In one embodiment, the sample period is 1 millisecond. In another embodiment, the sample period is 2 milliseconds. The previous motor torque command 5 is converted to handwheel coordinates. Both motor torque and handwheel torque are multiplied by gear efficiencies, added, and filtered to get an estimated rack torque. In certain embodiments, an observer can be used to find rack torque acting on the EPS system.

In certain embodiments, the rack torque estimation module 11003 includes: a first amplifier 501, a second amplifier 502, a third amplifier 503, and a lowpass filter module 504. The first amplifier 501 multiplies the previous motor torque command 5 by a factor of GAIN1, which is an assist mechanical ratio. The second amplifier 502 further multiplies the previous motor torque command 5 by a factor of GAIN2, which is a motor efficiency. The third amplifier 503 multiplies the handwheel torque 3 by a factor of GAIN3, which is a handwheel efficiency. The lowpass filter module 504 filters the amplified previous motor torque command 5 combined with the amplified handwheel torque 3 to generate the estimated rack torque 10.

In certain embodiments, the estimates rack torque 10 may be calculated in other ways different from the calculation described here, e.g. based on single or multi-body based models, observers etc. These approaches may take into account additional things such as system dynamics or non-linearities etc.

Figure 7:
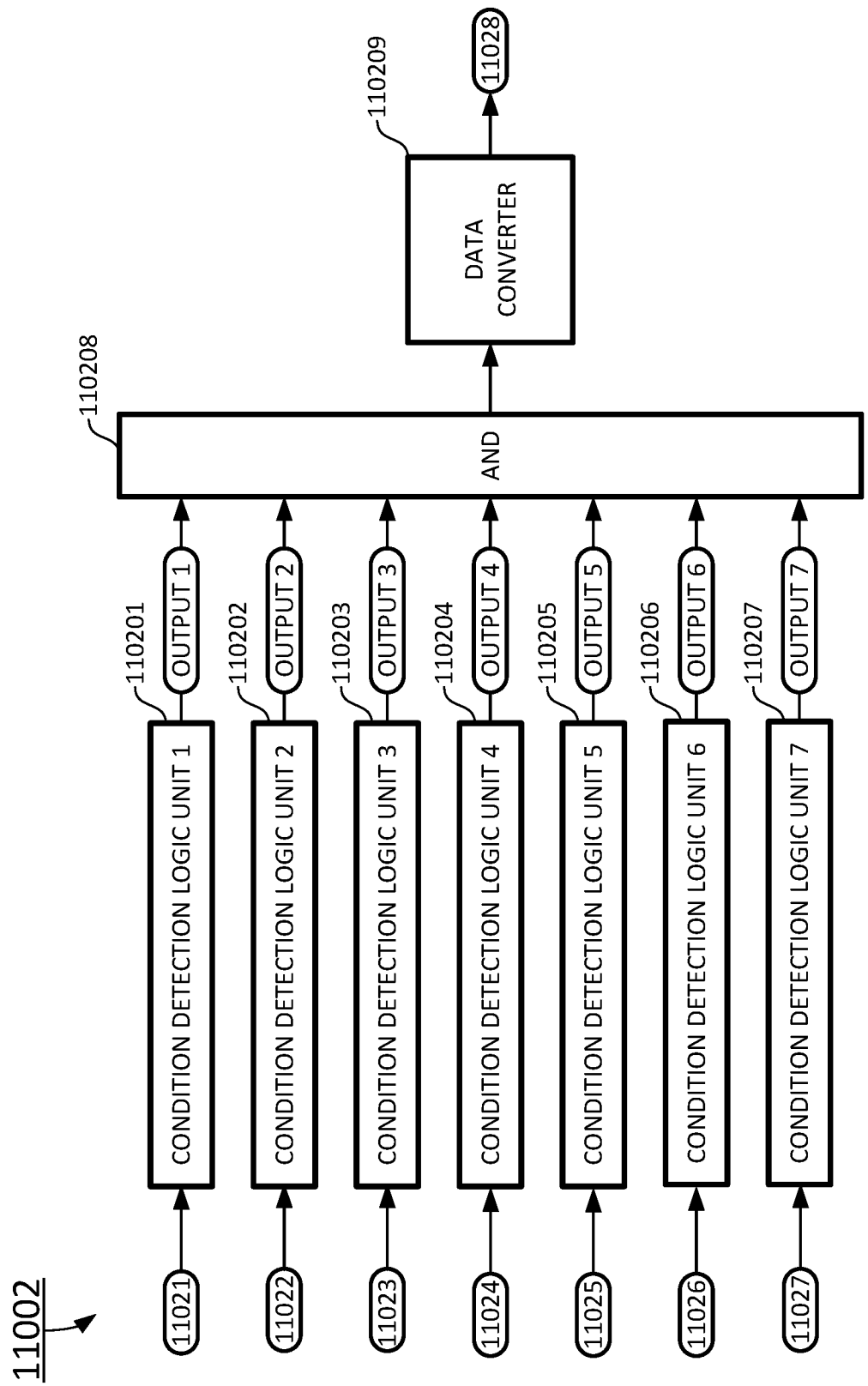
FIG. 7 is a functional block diagram illustrating an reference rack torque model of the payload estimation system in accordance with certain exemplary embodiments of the invention.

Referring now to FIG. 7, a functional block diagram illustrating a condition detection module 11002 of the payload estimation system 100 is shown according to certain exemplary embodiments of the invention.

FIG. 7 shows at least seven logic conditions going to an AND logic block 110208 to generate the flag 11028. The condition detection module 11002 includes a first condition detection logic unit 110201, a second condition detection logic unit 110202, a third condition detection logic unit 110203, a fourth condition detection logic unit 110204, a fifth condition detection logic unit 110205, a sixth condition detection logic unit 110206, a seventh condition detection logic unit 110207, the AND logic block 110208, and a data converter 110209.

In certain embodiments, the inputs to the condition detection module 11002 includes: a first input to the first condition detection logic unit 11021, a second input to the second condition detection logic unit 11022, a third input to the third condition detection logic unit 11023, a fourth input to the fourth condition detection logic unit 11024, a fifth input to the fifth condition detection logic unit 11025, a sixth input to the sixth condition detection logic unit 11026, and a seventh input to the seventh condition detection logic unit 11027.

Figure 8:
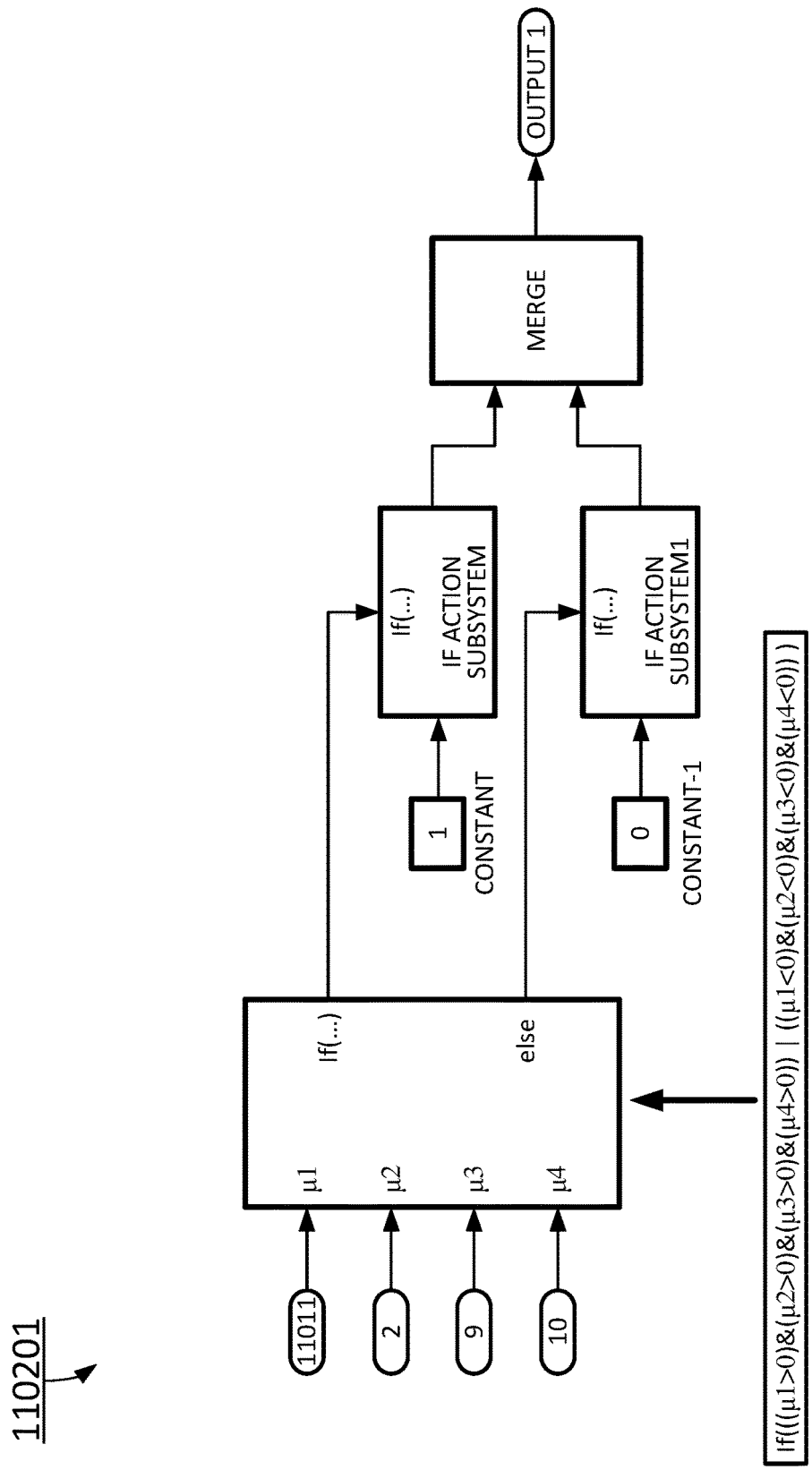
FIG. 8 is a functional block diagram illustrating a first condition detection logic unit of the reference rack torque model of the payload estimation system in accordance with certain exemplary embodiments of the invention.

FIG. 8 is a functional block diagram illustrating the first condition detection logic unit 110201 of the condition detection model 11002 of the payload estimation system 100 in accordance with certain exemplary embodiments of the invention.

The first input to the first condition detection logic unit 11021 includes: the handwheel position 11011 signal, the motor velocity 2 signal, the reference rack torque 9, and the estimated rack torque 10. An output 1 of the first input to the first condition detection logic unit 11021 is TRUE when the handwheel position 11011 signal, the motor velocity 2 signal, the reference rack torque 9, and the estimated rack torque 10 are all greater than 0, or when the handwheel position 11011 signal, the motor velocity 2 signal, the reference rack torque 9, and the estimated rack torque 10 are all less than 0.

Figure 9:
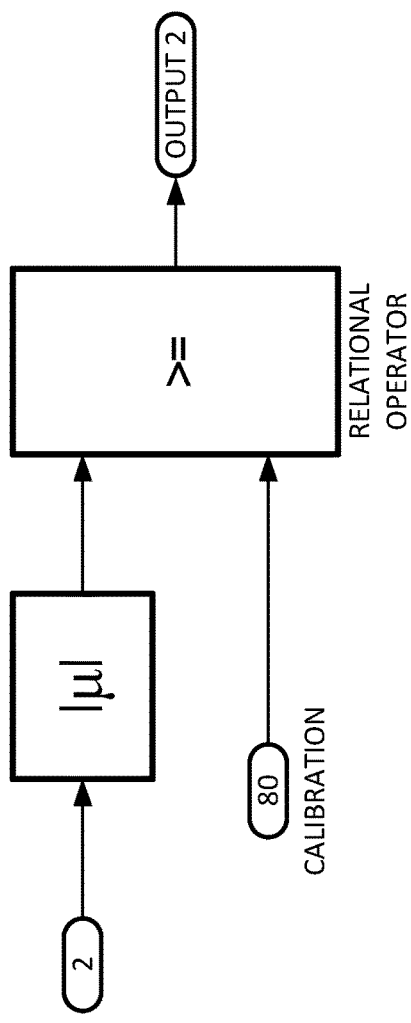
FIG. 9 is a functional block diagram illustrating a second condition detection logic unit of the reference rack torque model of the payload estimation system in accordance with certain exemplary embodiments of the invention.

FIG. 9 is a functional block diagram illustrating the second condition detection logic unit 110202 of the condition detection model 11002 of the payload estimation system 100 in accordance with certain exemplary embodiments of the invention.

The second input to the second condition detection logic unit 11022 includes: the motor velocity 2 signal and a condition motor velocity threshold 80. An output 2 of the second input to the second condition detection logic unit 11022 is TRUE when an absolute value of the motor velocity 2 signal is greater than or equal to condition motor velocity threshold 80.

Figure 10:
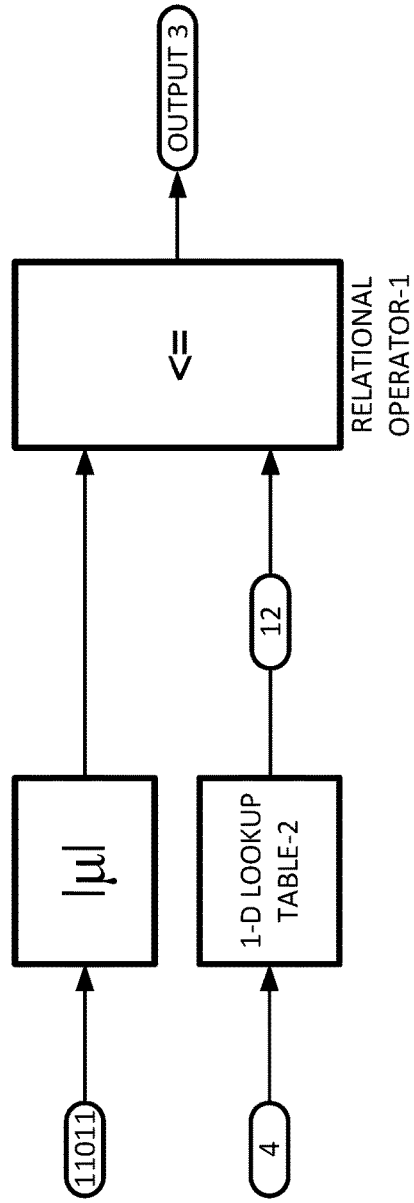
FIG. 10 is a functional block diagram illustrating a third condition detection logic unit of the reference rack torque model of the payload estimation system in accordance with certain exemplary embodiments of the invention.

FIG. 10 is a functional block diagram illustrating the third condition detection logic unit 110203 of the condition detection model 11002 of the payload estimation system 100 in accordance with certain exemplary embodiments of the invention.

The third input to the third condition detection logic unit 11023 includes: the handwheel position 11011, the vehicle speed 4 signal, and an absolute value of the handwheel position upper threshold 12. An output 3 of the third input to the second condition detection logic unit 11023 is TRUE when an absolute value of the handwheel position 11011 is less than or equal to the signal is greater than or equal to absolute value of the handwheel position upper threshold 12. The handwheel position upper threshold 12 is a function of the vehicle speed 4 and is determined by looking up a 1-D lookup table-2 based on the vehicle speed 4.

Figure 11:
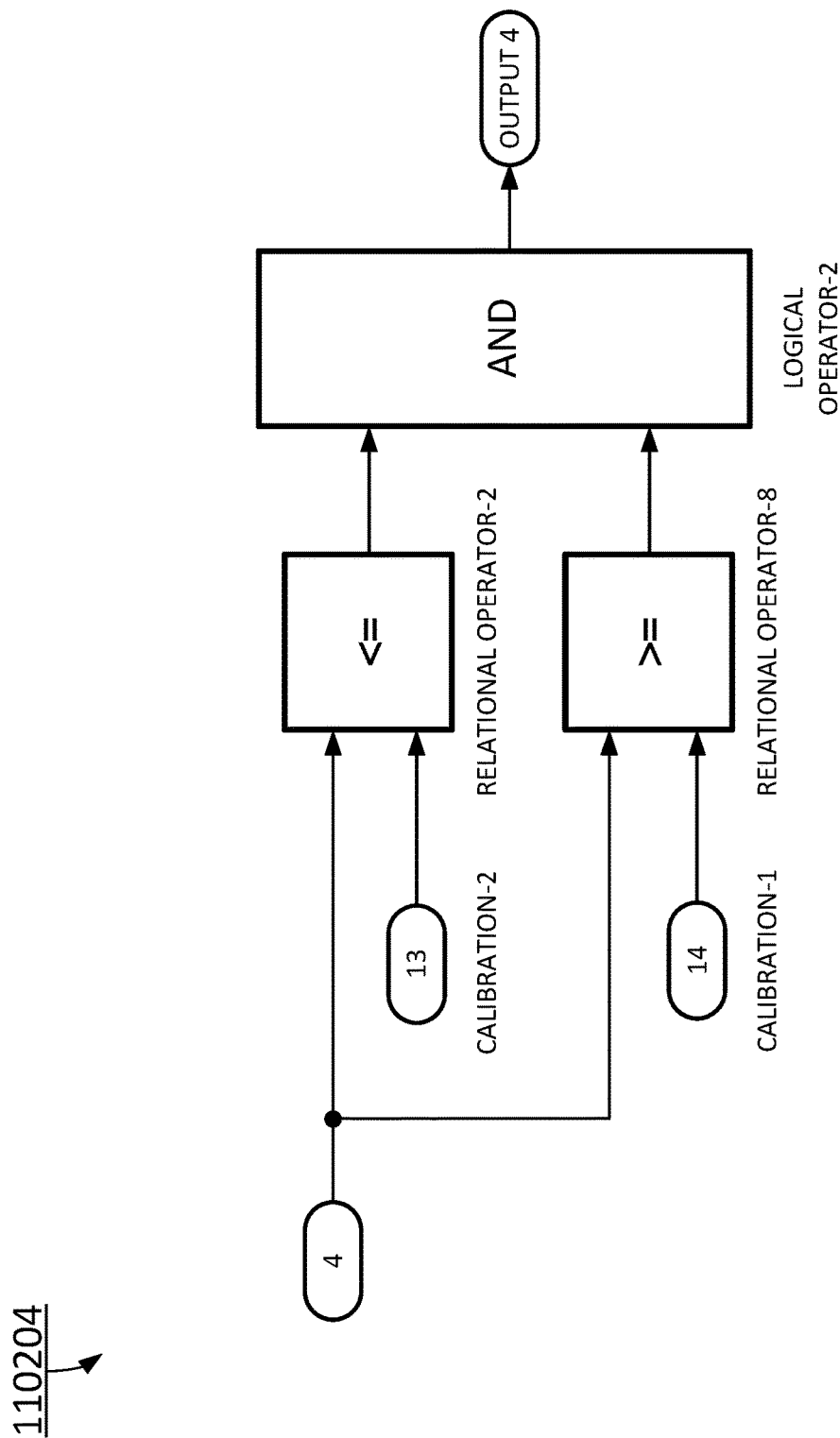
FIG. 11 is a functional block diagram illustrating a fourth condition detection logic unit of the reference rack torque model of the payload estimation system in accordance with certain exemplary embodiments of the invention.

FIG. 11 is a functional block diagram illustrating the fourth condition detection logic unit 110204 of the condition detection model 11002 of the payload estimation system 100 in accordance with certain exemplary embodiments of the invention.

The fourth input to the fourth condition detection logic unit 11024 includes: the vehicle speed 4 signal, a condition vehicle speed upper threshold 13, and a condition vehicle speed lower threshold 14. An output 4 of the fourth input to the second condition detection logic unit 11024 is TRUE when the vehicle is traveling at a speed between the condition vehicle speed upper threshold 13 and the condition vehicle speed lower threshold 14.

Figure 12:
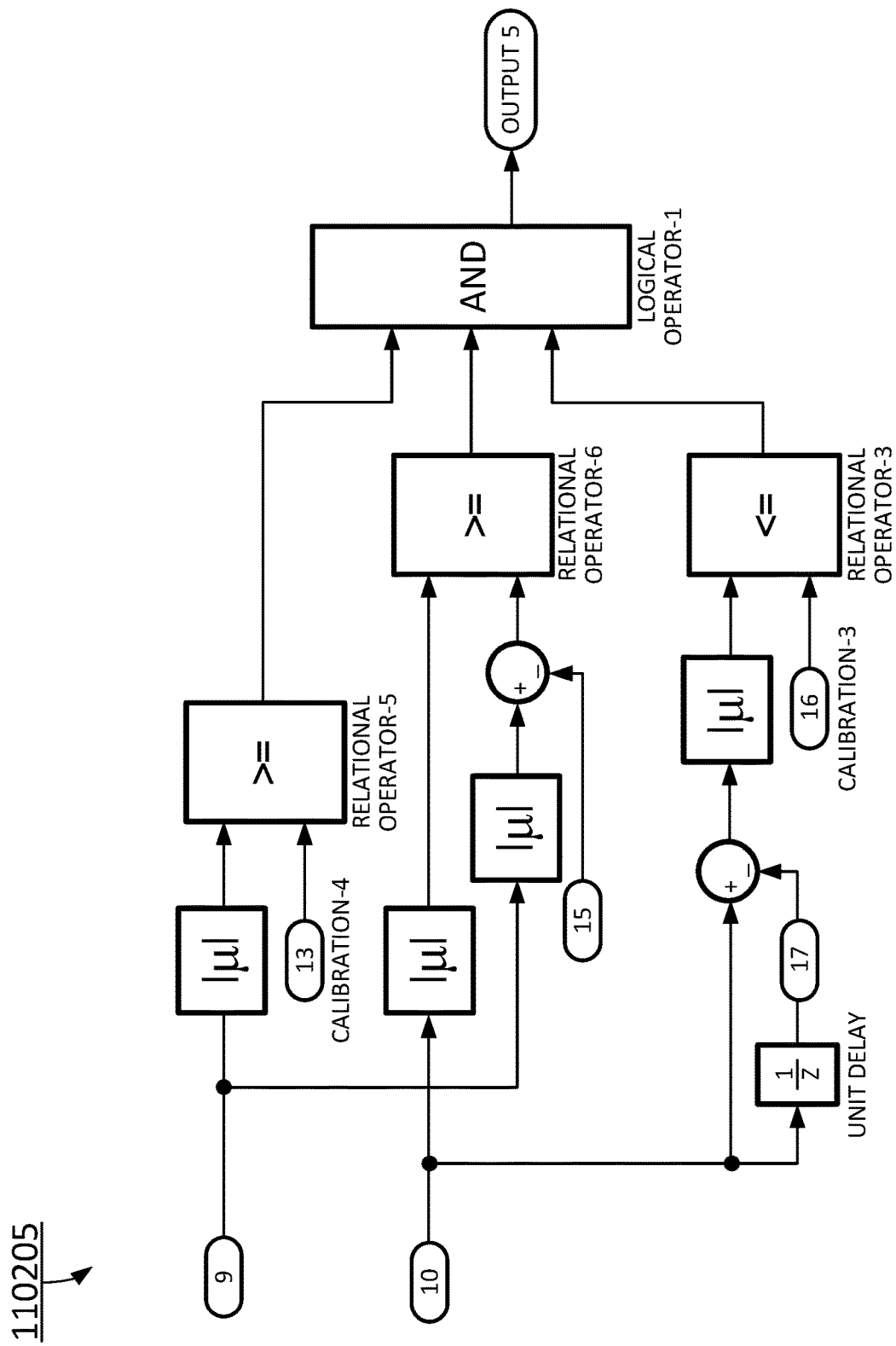
FIG. 12 is a functional block diagram illustrating a fifth condition detection logic unit of the reference rack torque model of the payload estimation system in accordance with certain exemplary embodiments of the invention.

FIG. 12 is a functional block diagram illustrating the fifth condition detection logic unit 110205 of the condition detection model 11002 of the payload estimation system 100 in accordance with certain exemplary embodiments of the invention.

The fifth input to the fifth condition detection logic unit 11025 includes: the reference rack torque 9, the estimated rack torque 10, a reference rack torque lower threshold 13, a predetermined constant delta 15, a condition delayed estimated rack torque threshold 16, and a previous estimated rack torque 17. An output 5 of the fifth input to the fifth condition detection logic unit 11025 is TRUE: (a) when the absolute value of the reference rack torque 9 is greater than or equal to a reference rack torque lower threshold 13, and (b) when an absolute value of the estimated rack torque 10 is greater than or equal to an absolute value of the reference rack torque 9 plus the predetermined constant delta 15, and (c) when an absolute value of the difference between the reference rack torque 9 and the estimated rack torque 10 is less than or equal to the condition delayed estimated rack torque threshold 16.

Figure 13:
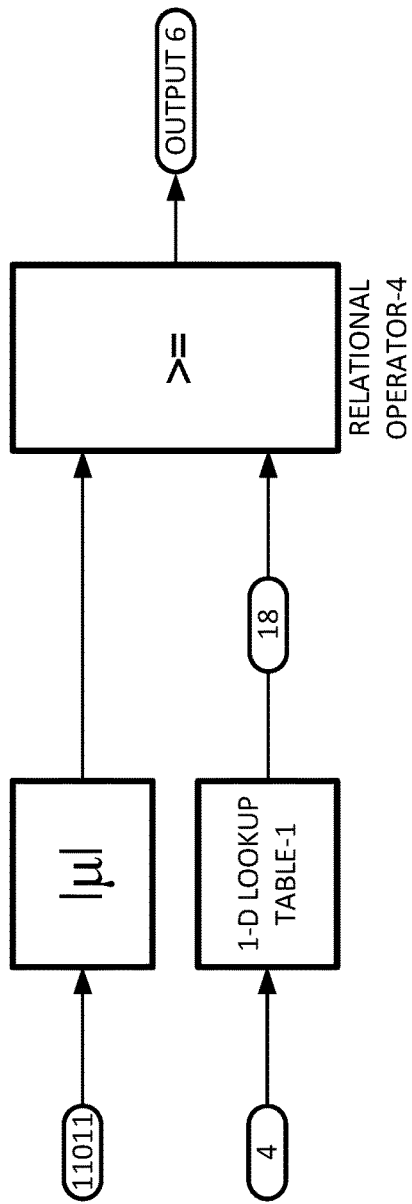
FIG. 13 is a functional block diagram illustrating a sixth condition detection logic unit of the reference rack torque model of the payload estimation system in accordance with certain exemplary embodiments of the invention.

FIG. 13 is a functional block diagram illustrating the sixth condition detection logic unit 110206 of the condition detection model 11002 of the payload estimation system 100 in accordance with certain exemplary embodiments of the invention.

The sixth input to the second condition detection logic unit 11026 includes: the handwheel position 11011, the vehicle speed 4, and an absolute value of handwheel position lower threshold 18. An output 6 of the sixth input to the sixth condition detection logic unit 11026 is TRUE when an absolute value of the handwheel position 11011 is greater than or equal to the absolute value of handwheel position lower threshold 18. The absolute value of handwheel position lower threshold 18 is a function of the vehicle speed 4.

Figure 14:
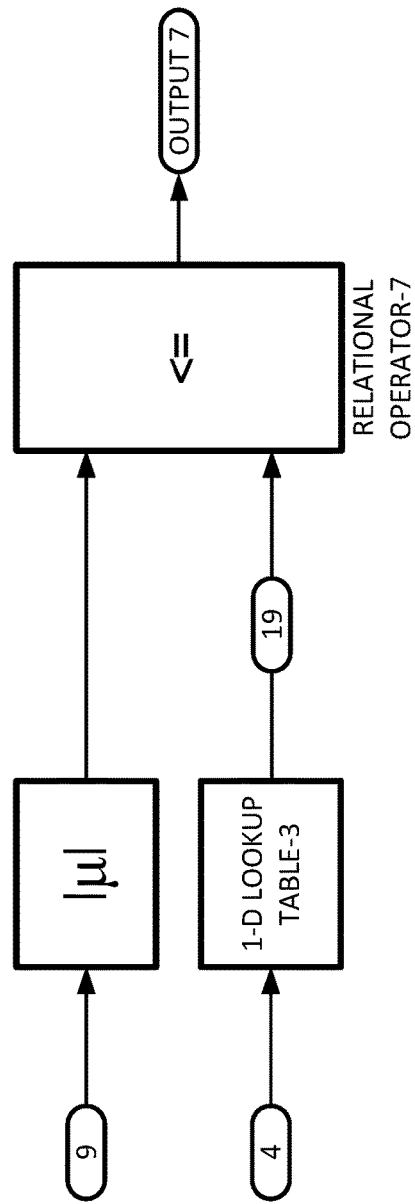
FIG. 14 is a functional block diagram illustrating a seventh condition detection logic unit of the reference rack torque model of the payload estimation system in accordance with certain exemplary embodiments of the invention.

FIG. 14 is a functional block diagram illustrating the seventh condition detection logic unit 110207 of the condition detection model 11002 of the payload estimation system 100 in accordance with certain exemplary embodiments of the invention.

The seventh input to the second condition detection logic unit 11027 includes: the reference rack torque 9, the vehicle speed 4, and a max load rack torque 19. An output 7 of the seventh input to the seventh condition detection logic unit 11027 is TRUE, when an absolute value of the reference rack torque 9 is less than or equal to the absolute value of the max load rack torque 19. The max load rack torque 19 is also a function of the vehicle speed 4.

Figure 15:
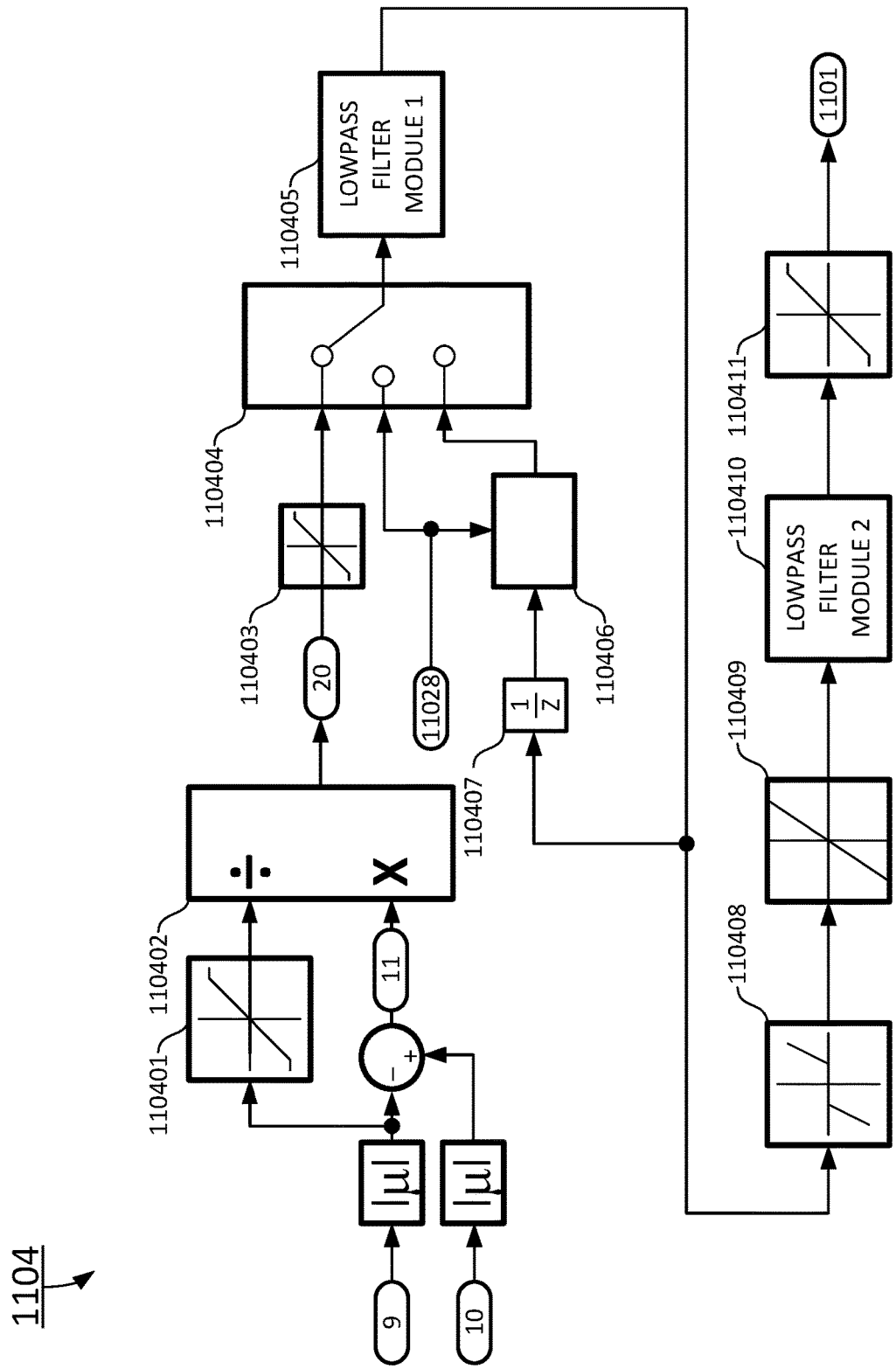
FIG. 15 is a functional block diagram illustrating an additional axle load factor calculation of the payload estimation system in accordance with certain exemplary embodiments of the invention.

Referring now to FIG. 15, a functional block diagram illustrating the load factor calculation module 11004 of the payload estimation system 100 is shown according to certain exemplary embodiments of the invention.

In certain embodiments, the load factor calculation module 11004 includes one or more of: a first saturation module 110401, a divider module 110402, a second saturation module 110403, a switch module 110404, a first lowpass filter module 110405, a falling triggered system module 110406, a time delay module 110407, a deadzone module 110408, a rate limiter 110409, a second lowpass filter module 110410, and a third saturation module 110411. The first saturation module 110401 generates a normalizing factor based on the absolute value of the reference rack torque 9. In one embodiment, the first saturation module 110401 has a lower limit of 0, and an upper limit of 1. An initial load factor 20 is a difference 11 between the estimated rack torque 10 and the reference rack torque 9 divided by the normalizing factor through a divider module 110402. The initial load factor 20 passes through the first saturation module 110403 such that the initial load factor 20 has a value between a lower limit and an upper limit. In one embodiment, the lower limit is 0.5 and the upper limit is 200. In other embodiments, the lower limit may vary between 0.1 and 5, and the upper limit may vary between 10 and 300. The initial load factor 20 passes through the second saturation module 110403 to be normalized such that the initial load factor 20 has a value between 0 and 1. The switch module 110404 selects the normalized initial load factor 20 according to the flag 110208, and a delayed filtered initial load factor 20.

In certain embodiments, an output of the triggered system module 110406 equals to the input to the triggered system module 110406 only when the flag 11028 falls from 1 to 0 (or from TRUE to FALSE). Otherwise, the output of the triggered system module 110406 is held to a predetermined constant value.

In certain embodiments, an output of the deadzone module 110408 becomes zero for inputs within a dead zone, and an input signal is offset by either the Start or End value when the input is outside of the dead zone. The rate limiter module 110409 limits rising and falling rate of change of an input signal. When an input to the rate limiter module 110409 changes too fast (i.e. high rate of change), an output rate of change of the rate limiter module 110409 is still limited based on pre-defined rising and falling rate values.

The initial load factor 20 is updated only when the flag 110208 is true. The updated load factor 20 passes through the deadzone module 110408, the rate limiter 110409, the second lowpass filter module 110410, and the third saturation module 110411 to minimize noise in the load factor calculation module 1104 to produce the additional axle load factor 1101.

In another aspect, the invention relates to a method for estimating payload estimation for maintaining consistent steering feel using electric power steering (EPS) signals.

Figure 16:
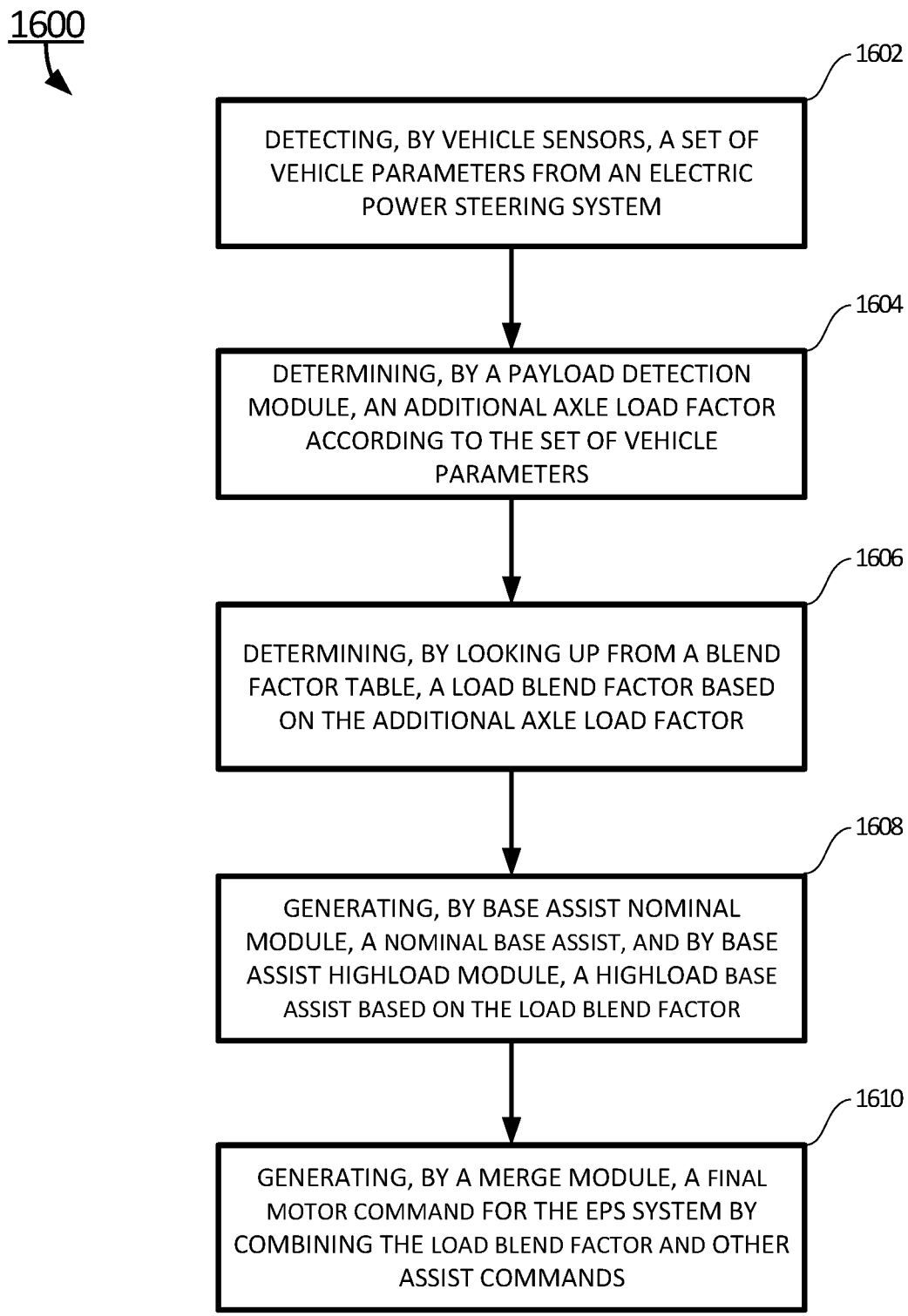
FIG. 16 is a flowchart illustrating a method of payload estimation using electric power steering signal in accordance with certain exemplary embodiments of the invention.

Referring now to FIG. 16, a flowchart illustrating a method of payload estimation using electric power steering signals is shown in accordance with certain exemplary embodiments of the invention.

At block 1602, the method includes: detecting, by multiple sensors of an electric power steering (EPS) system of a vehicle, multiple EPS signals from the EPS system.

In certain embodiments, the multiple EPS signals comprises: a motor position 1 signal received from a power steering motor position sensor, a motor velocity 2 signal received from the EPS motor velocity sensor 32, the handwheel torque 3 signal received from the handwheel torque sensor 31, a vehicle speed 4 signal received from one or more vehicle speed sensors, and a previous motor torque command 5 signal received from the EPS.

At block 1604, the method includes: receiving, by a payload detection module 110 of a payload estimation system 100, multiple signals from the EPS system to generate an additional axle load factor 1101.

In certain embodiments, the method may also include: generating, by a condition detection module 11002 of the payload detection module 110, a flag 11028 according to multiple EPS signals, when one or more conditions are desirable to compare an estimated rack torque 10 with a reference rack torque 9, the flag 11028 is TRUE, generating, by a rack torque estimation module 11003, the estimated rack torque 10, generating, by a reference model module 11005, the reference rack torque 9 according to a stillness factor and an offset factor, and calculating, by a load factor calculation module 11004 the additional axle load factor 1101 based on a difference between the estimated rack torque 10 and the reference rack torque 9, and the flag

11028. The method may also include: converting, by an amplifier 11001 of the payload detection module 110, the motor position 1 signal to a handwheel position 11011.

In certain embodiments, the method also includes: generating the stiffness factor K according to a first lookup table based on the vehicle speed; generating the offset factor B according to a second lookup table based on the vehicle speed; and generating the reference rack torque by multiplying the stiffness factor K with the handwheel position HWPOS and adding the offset factor B.

In certain embodiments, the method may also include: multiplying, by a first amplifier 501 of the rack torque estimation module 11003, the previous motor torque command 5 by a factor of GAIN1, which is an assist mechanical ratio, multiplying, by a second amplifier 502 of the rack torque estimation module 11003, the previous motor torque command 5 by a factor of GAIN2, which is a motor efficiency, multiplying, by a third amplifier 503 of the rack torque estimation module 11003, the handwheel torque 3 by a factor of GAIN3, which is a handwheel efficiency, and filtering, by a lowpass filter module 504 of the rack torque estimation module 11003, the amplified previous motor torque command 5 combined with the amplified handwheel torque 3 to generate the estimated rack torque 10.

In certain embodiments, the method may also include: calculating an initial load factor 20, which is a difference 11 between the estimated rack torque 10 and the reference rack torque 9 divided by a normalizing factor, selecting, by a switch module 110404 of the load factor calculation module 11004, an initial load factor 20 according to the flag 110208, and a delayed load factor, updating the initial load factor 20 when the flag 110208 is TRUE, and minimizing noises in the load factor calculation module 1104 by using a deadzone module 110408, a rate limiter 110409, a second lowpass filter module 110410, and a third saturation module 110411 to produce the additional axle load factor 1101.

At block 1606, the method includes: determining, by a blend factor table 120 of the payload estimation system 100, a load blend factor 1102 according to the additional axle load factor 1101.

At block 1608, the method also includes: generating, by a first multiplier 150, a blended nominal base assist 1103 signal by combining the load blend factor 1102 and a handwheel torque 3 signal processed by a nominal base assist module 130, and generating, by a second multiplier 160, a blended highload base assist 1104 signal by combining the load blend factor 1102 and the handwheel torque 3 signal processed by a highload base assist module 140.

In certain embodiments, the blended nominal base assist 1103 is a product of the nominal base assist 11031 and an offset load blend factor 1102, which is 1 minus the load blend factor 1102. The blended highload base assist 1104 is a product of the highload base assist 11041 and the load blend factor 1102.

At block 1610, the method includes: combining, by a merge module 170, the blended nominal base assist 1103 and the blended highload base assist 1104 to generate a motor torque command 7 for the EPS system. The method may also include combining the motor torque command 7 with one or more additional EPS signals, such as a high frequency assist signal, and a damping signal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A payload estimation system of an electric power steering (EPS) system comprising:
   a motor; and
   a processor configured to:
   detect payload according to a plurality of EPS signals and generate an axle load factor;
   determine a load blend factor according to the axle load factor;
   generate a nominal base assist based on a handwheel torque signal;
   generate a highload base assist based on the handwheel torque; and
   combine a blended nominal base assist and a blended highload base assist to generate a motor torque command for generating a corresponding amount of torque from the motor, the blended nominal base assist includes the nominal base assist multiplied by an offset load blend factor, and the offset load blend factor comprises 1 minus the load blend factor, and the blended highload base assist comprises the highload base assist multiplied by the load blend factor;
   the processor further configured to:
   generate an estimated rack torque;
   generate a reference rack torque according to a stiffness factor and an offset factor; and
   generate an additional axle load factor based on a difference between the estimated rack torque and the reference rack torque.

2. The payload estimation system of claim 1, wherein the processor is further configured to receive:
   a motor position signal received from a power steering motor position sensor, a motor velocity signal received from a power steering motor velocity sensor, the handwheel torque signal received from a handwheel torque sensor, a vehicle speed signal received from one or more vehicle speed sensors, and
   a previous motor torque command signal associated with a unit time delayed motor torque command signal.

3. The payload estimation system of claim 1, wherein the motor torque command is combined with at least one of a high frequency assist signal, and a damping signal.

4. The payload estimation system of claim 2, wherein the processor is further configured to:
   generate a flag, wherein when one or more conditions are desirable to compare the estimated rack torque with the reference rack torque, the flag is TRUE; and
   generate the additional axle load factor based on the difference between the estimated rack torque and the reference rack torque, and the flag.

5. The payload estimation system of claim 4, wherein reference rack torque is calculated according to following formula:

Reference rack torque=$K$*HWPOS+$B$, wherein K is the stiffness factor obtained by a first lookup table based on the vehicle speed, HWPOS is a handwheel position, and B is the offset factor obtained by a second lookup table based on the vehicle speed.

6. The payload estimation system of claim 2, further comprising an amplifier configured to convert the motor position signal to a handwheel position.

7. The payload estimation system of claim 4, further comprising:
a first amplifier configured to increase the previous motor torque command by a factor of GAIN1, wherein the GAIN1 comprises an assist mechanical ratio;
a second amplifier configured to further increase the previous motor torque command by a factor of GAIN2, wherein the GAIN2 comprises a motor efficiency;
a third amplifier configured to increase the handwheel torque by a factor of GAIN3, wherein the GAIN3 comprises a handwheel efficiency; and
a lowpass filter module configured to filter the amplified previous motor torque command combined with the amplified handwheel torque to generate the estimated rack torque.

8. The payload estimation system of claim 4, wherein processor is further configured to:
calculate an initial load factor, wherein the initial load factor is a difference between the estimated rack torque and the reference rack torque divided by a normalizing factor, wherein the normalizing factor is calculated by passing an absolute value of the reference rack torque through a first saturation module;
update the initial load factor only when the flag is TRUE; and
minimize noise of the additional axle load factor and generate the additional axle load factor.

9. The payload estimation system of claim 8, further comprising:
a deadzone module configured to condition the filtered initial load factor;
a rate limiter module configured to limit the filtered initial load factor to a first predetermined range;
a second lowpass filter module configured to minimize the noise; and
a third saturation module to limit the additional axle load factor to a second predetermined range.

10. A method of estimating a payload for maintaining a substantially consistent steering feel produced at least in-part by an electric power steering (EPS) system, the method comprising:
receiving a plurality of EPS signals to generate an additional axle load factor;
determining a load blend factor according to the additional axle load factor;
generating a blended nominal base assist signal by combining the load blend factor and a handwheel torque signal;
generating a blended highload base assist signal by combining the load blend factor and the handwheel torque signal; and
combining the blended nominal base assist and the blended highload base assist to generate a motor torque command
generating an estimated rack torque;
generating a reference rack torque according to a stiffness factor K and an offset factor B; and
calculating the additional axle load factor based on a difference between the estimated rack torque and the reference rack torque.

11. The method of claim 10, wherein the plurality of EPS signals comprises:
a motor position signal received from a power steering motor position sensor;
a motor velocity signal received from a power steering motor velocity sensor;
the handwheel torque signal received from a handwheel torque sensor;
a vehicle speed signal received from one or more vehicle speed sensors; and
a previous motor torque command signal associated with a unit time delayed motor torque command signal.

12. The method of claim 11, wherein the blended nominal base assist comprises a nominal base assist multiplied by an offset load blend factor, wherein the offset load blend factor comprises 1 minus the load blend factor, and the blended highload base assist comprises a highload base assist multiplied by the load blend factor.

13. The method of claim 10, further comprising:
combining the motor torque command with at least one additional EPS signal, wherein the at least one additional EPS signal includes at least one of a high frequency assist signal and a damping signal.

14. The method of claim 11, further comprising:
generating a flag according to the plurality of EPS signals, wherein when one or more conditions are desirable to compare the estimated rack torque with the reference rack torque, the flag is TRUE; and
calculating the additional axle load factor based on a difference between the estimated rack torque and the reference rack torque, and the flag.

15. The method of claim 14, wherein generating the reference rack torque comprises:
generating the stiffness factor K according to a first lookup table based on the vehicle speed;
generating the offset factor B according to a second lookup table based on the vehicle speed; and
generating the reference rack torque by multiplying the stiffness factor K with a handwheel position HWPOS and adding the offset factor B.

16. The method of claim 14, further comprising:
converting, by an amplifier, the motor position signal to a handwheel position.

17. The method of claim 14, further comprising:
multiplying, by a first amplifier, the previous motor torque command by a factor of GAIN1, wherein the GAIN1 comprises an assist mechanical ratio;
multiplying, by a second amplifier, the previous motor torque command by a factor of GAIN2, wherein the GAIN2 comprises a motor efficiency;
multiplying, by a third amplifier, the handwheel torque by a factor of GAIN3, wherein the GAIN3 comprises a handwheel efficiency; and
filtering, by a lowpass filter module of the rack torque estimation module, the amplified previous motor torque command combined with the amplified handwheel torque to generate the estimated rack torque.

18. The method of claim 14, further comprising:
Calculating an initial load factor, wherein the initial load factor is a difference between the estimated rack torque and the reference rack torque divided by a normalizing factor, wherein the normalizing factor is calculated by passing an absolute value of the reference rack torque through a first saturation module;
Updating the initial load factor only when the flag is TRUE; and
Minimizing noise of the additional axle load factor to generate the additional axle load factor.

19. The method of claim 18, further comprising:
conditioning a filtered initial load factor;

limiting the filtered initial load factor to a first predetermined range;
filtering, by a second lowpass filter module, to minimize noise in the additional axle load factor; and
producing the additional axle load factor by limiting the additional axle load factor to a second predetermined range.

* * * * *